INVENTOR.
PHILIP A. SIDELL

United States Patent Office 3,445,297
Patented May 20, 1969

1

3,445,297
BATTERY EJECTOR FOR PORTABLE APPLIANCES
Philip A. Sidell, West Hartford, Conn., assignor to The Ingraham Company, Bristol, Conn., a corporation of Connecticut
Filed June 5, 1967, Ser. No. 643,467
Int. Cl. H01m 1/04; G04c 3/00; F21l 15/08
U.S. Cl. 136—173     6 Claims

ABSTRACT OF THE DISCLOSURE

A combination housing and battery ejector for a battery powered clock including a finger operated pivoted wall portion having a laterally extending arm disposed below the battery to eject the battery upwardly out of the housing when the wall portion is pivoted outwardly.

---

Figure 1:
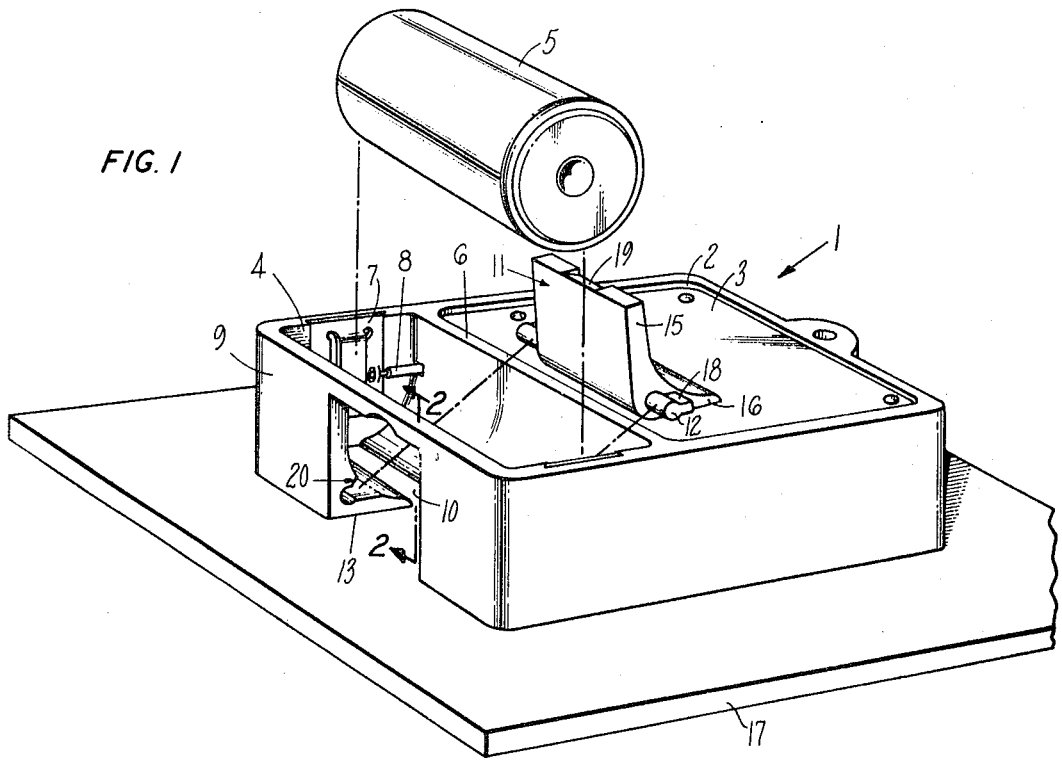

This invention relates to battery operated portable appliances such as clocks, radios, motors for advertising displays, etc., and more particularly to battery ejectors therefor.

An object of the present invention is to provide new and improved battery ejector means which reduces material needs and costs by combining the functions of battery housing and ejector in one unit. The combined unit also blends the exposed and movable surfaces of the ejector with the housing to provide an unobtrusive contour of these elements.

Another object of the present invention is to provide battery ejector means which removes a battery from a compartment sized to closely receive the same and thus avoids simply moving the battery and a portion of the housing to a relatively more accessible position for subsequent battery removal.

Another object of the present invention is to provide battery ejector means which form part of a housing that confines a battery, and which ejector means, after utilization, is automatically returned to readiness position upon insertion of a battery into the housing.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 2:
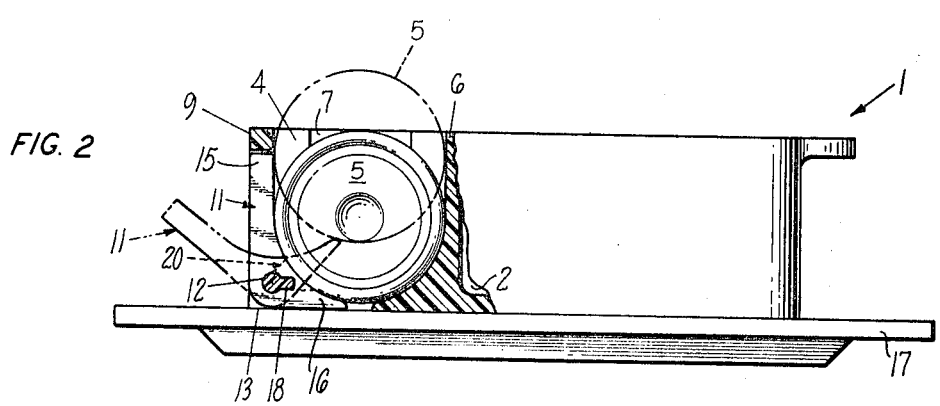

In the drawings:

FIG. 1 is a perspective view from the rear, partly exploded, showing clock and battery housing of the invention, with the ejector shown removed; and FIG. 2 is an assembled side elevation, sectioned along line 2—2 of FIG. 1, and partly broken away, showing the ejector of FIG. 1 in readiness posture in full line and in operating position in phantom line.

The drawings illustrate a clock, for example, having a face 17 secured to a housing designated generally by 1 and having a compartment 2 to receive a motor mechanism 3, and a compartment 4 to receive a battery 5 separated from the motor compartment 2 by a divider wall 6. An electrical energy flow path between battery 5 and motor 3 may be provided by circuit terminals 7 and leads 8 as shown, or by any other suitable arrangement of structure.

2

The need to provide small size and closely confining housing for batteries in portable battery powered mechanisms causes difficulties to be experienced in removing cells. The present invention overcomes these difficulties by providing a readily accessible finger operated ejector 11 in outer wall 9 and face wall 13 of the housing 1. Pivot pins 12 are shown mounting the ejector 11 within the cut-out 10 of the walls 9 and 13, although any other appropriate association between the ejector and the housing may be utilized. Lever arm 15 and operating tongue 16 of the ejector both engage a battery 5 closely confined in the housing. The first class lever 11 normally is concealed as an integral portion of the walls 9 and 13 of the battery compartment 4.

FIG. 2 discloses the ejector part way through the arc of the travel during which it ejects a confined battery. The shape of the lever 11, the location of the pins 12 and their pivot line, and the inner contours of the battery compartment are coordinated to ensure that the ejector can be displaced sufficiently to provide for ready grasping of the battery. In addition and as shown, stops such as tangs 18 formed integrally with the pins 12 bottom on shoulder 20 to ensure that the ejector will always be returned to readiness position upon a battery being pressed into the compartment. The tangs 18 thus are positioned to provide adequate displacement of the ejector, but they also preclude its displacement to the point at which a battery could be slipped past the same in open position.

Operation of the ejector is effected by finger pressure brought to bear downwardly at slot 19 upon arm 15 as if to pry the arm from the wall 9 and thus from its closed or readiness position. This force is transmitted by the pins 12 through approximately a right angle to the tongue 16. The energy thus expended is translated into motion of the tongue 16 through an arc confined within the space occupied by the battery. As the tongue rises in the arc, it bears forcefully against a battery therein, raising and ejecting the same.

The invention thus provides a durable, reliable, easily operated battery ejector for a variety of battery powered mechanisms, which ejector is held retracted by a battery and forms part of the battery housing; and has unobtrusive operating features smoothly blending with the housing.

As will be apparent to persons skilled in the art, various modifications and adaptations of the structure above-described will become readily apparent without departure from the spirit and scope of the invention, the scope of which is defined in the appended claims.

I claim:

1. In a housing adapted to receive a powered mechanism, a battery to power the mechanism, and a compartment in the housing shaped to closely receive the battery, the combination therewith of an ejector to remove the battery from the battery compartment and the housing, said ejector comprising a lever forming part of the wall structure of the battery compartment.

2. The structure defined in claim 1 in which the ejector comprises a pivotable lever engageable with the battery.

3. The structure defined in claim 2 in which the ejector is a first class lever pivoted on pins therewith associated.

4. The structure defined in claim 3 wherein the battery compartment includes inner, outer and face walls, the lever forms portions of the outer and face walls and, in readiness position, lies substantially flush with the same and is accessible for utilization.

5. The structure defined in claim 4 in which the lever and the battery compartment are mutually adapted to ensure that insertion of a cell into the said compartment will return the lever to readiness for a subsequent ejection.

6. The structure defined in claim 5 including stops to limit the travel of the lever in the operative direction.

References Cited

UNITED STATES PATENTS 2,205,316 6/1940 Stratton.
2,589,071 3/1952 Galasso _____ 136—173.12

WINSTON A. DOUGLAS, *Primary Examiner.*

DONALD L. WALTON, *Assistant Examiner.*

U.S. Cl. X.R.

240—10.65